(12) United States Patent
Akutsu

(10) Patent No.: US 8,360,522 B2
(45) Date of Patent: Jan. 29, 2013

(54) VEHICLE SEAT

(75) Inventor: Takeshi Akutsu, Shioya-gun (JP)

(73) Assignee: TS Tech Co., Ltd., Asaka-Shi, Saitama-Ken (JP)

( * ) Notice: Subject to any disclaimer, the term of this patent is extended or adjusted under 35 U.S.C. 154(b) by 501 days.

(21) Appl. No.: 12/307,859

(22) PCT Filed: Jul. 9, 2007

(86) PCT No.: PCT/JP2007/063611
§ 371 (c)(1),
(2), (4) Date: Mar. 4, 2010

(87) PCT Pub. No.: WO2008/004678
PCT Pub. Date: Jan. 10, 2008

(65) Prior Publication Data
US 2010/0164270 A1     Jul. 1, 2010

(30) Foreign Application Priority Data
Jul. 7, 2006   (JP) ................................ 2006-188562

(51) Int. Cl.
*B60N 2/02* (2006.01)
(52) U.S. Cl. .................................................. 297/284.4
(58) Field of Classification Search ................ 297/284.4
See application file for complete search history.

(56) References Cited

U.S. PATENT DOCUMENTS

| | | | | |
|---|---|---|---|---|
| 5,518,294 A * | 5/1996 | Ligon et al. | ................. | 297/284.4 |
| 6,682,144 B2 * | 1/2004 | Klingler | ..................... | 297/284.4 |
| 6,758,522 B2 * | 7/2004 | Ligon et al. | ................. | 297/284.4 |
| 6,918,633 B2 * | 7/2005 | Forkel et al. | ................ | 297/284.4 |
| 7,131,694 B1 * | 11/2006 | Buffa | ......................... | 297/284.4 |
| 7,237,847 B2 * | 7/2007 | Hancock et al. | ........ | 297/284.4 X |
| 7,270,374 B2 * | 9/2007 | Moriggi | ..................... | 297/284.4 |
| 7,290,837 B2 * | 11/2007 | Sugiyama et al. | ..... | 297/284.4 X |
| 7,458,637 B2 * | 12/2008 | Norman et al. | ............ | 297/284.4 |
| 7,575,278 B2 * | 8/2009 | Wissner et al. | ............ | 297/284.4 |
| 7,770,972 B2 * | 8/2010 | Popa | ......................... | 297/284.4 |
| 7,874,618 B2 * | 1/2011 | Kohl et al. | ................. | 297/284.4 |
| 7,963,599 B2 * | 6/2011 | Omori et al. | ........... | 297/284.4 X |
| 7,967,380 B2 * | 6/2011 | Omori et al. | ............... | 297/284.4 |
| 8,011,726 B2 * | 9/2011 | Omori et al. | ........... | 297/284.4 X |
| 8,061,774 B2 * | 11/2011 | Omori et al. | ............... | 297/284.4 |
| 8,070,223 B2 * | 12/2011 | Omori et al. | ........... | 297/284.4 X |
| 8,132,857 B2 * | 3/2012 | Omori et al. | ........... | 297/284.4 X |
| 8,132,858 B2 * | 3/2012 | Omori et al. | ........... | 297/284.4 X |
| 2004/0169407 A1 * | 9/2004 | Ligon et al. | ................ | 297/284.4 |
| 2004/0178670 A1 * | 9/2004 | Klingler | ..................... | 297/284.4 |
| 2004/0245823 A1 * | 12/2004 | Ligon et al. | ................ | 297/284.4 |
| 2005/0029847 A1 * | 2/2005 | Forkel | ......................... | 297/284.4 |
| 2006/0131938 A1 * | 6/2006 | Moriggi | ..................... | 297/284.4 |

(Continued)

*Primary Examiner* — Rodney B White
(74) *Attorney, Agent, or Firm* — Browdy and Neimark, PLLC

(57) ABSTRACT

A vehicle seat comprises a square-frame-shaped seatback frame including a pair of side frames, a seat spring (32A, 32B) mounted between the side frames, a single plate-shaped flexible cushion plate (31) mounted on its back face to the seat spring, a seatback cushion provided in front of the cushion plate, a single plate-shaped flexible auxiliary plate (40) provided between the seatback cushion and the cushion plate and mounted on the cushion plate. The cushion plate has a vertically extending rib (36) with which the lower portion of the auxiliary plate comes in contact.

11 Claims, 6 Drawing Sheets

U.S. PATENT DOCUMENTS

2006/0232114 A1* 10/2006 Sugiyama et al. ......... 297/284.4
2007/0057548 A1* 3/2007 Buffa ........................ 297/284.4
2008/0231095 A1* 9/2008 Brauning ............... 297/284.4 X
2009/0079245 A1* 3/2009 Marcantoni ................ 297/284.4
2009/0146476 A1* 6/2009 Kan et al. ................... 297/284.4
2010/0078974 A1* 4/2010 Nathan .................. 297/284.4 X
2012/0007399 A1* 1/2012 Jaranson et al. ........... 297/284.4

* cited by examiner

VEHICLE SEAT

TECHNICAL FIELD

The present invention relates to a vehicle seat and particularly to improvement of a mechanism for supporting a cushion of a seatback.

BACKGROUND ART

A prior-art seatback of a vehicle seat includes a seatback cushion, a flexible cushion plate provided behind the seatback cushion, an auxiliary plate provided between the cushion plate and the seatback cushion. The auxiliary plate is caused to bulge forward by an operating force from an operation portion to push the seatback cushion out forward by a proper amount.
Patent Document 1: JP 2006-122297 A

DISCLOSURE OF THE INVENTION

The auxiliary plate bulges forward when its lower portion moves upward with respect to the cushion plate. When the lower portion of the auxiliary plate moves downward with respect to the cushion plate, the forward bulge retracts and the auxiliary plate becomes substantially parallel to the cushion plate. Moreover, the lower portion of the auxiliary plate is strongly pushing against the cushion plate.

Therefore, in moving the lower portion of the auxiliary plate up or down, a lower portion of the auxiliary plate and a lower portion of the cushion plate are in contact with each other in large areas, which makes it difficult to suppress noise generation.

Consequently, it is an object of the present invention to provide a vehicle seat for effectively suppressing noise generated between the auxiliary plate and the cushion plate when the auxiliary plate moves upward or downward with respect to the cushion plate.

BEST MODE FOR CARRYING OUT THE INVENTION

Figure 1:
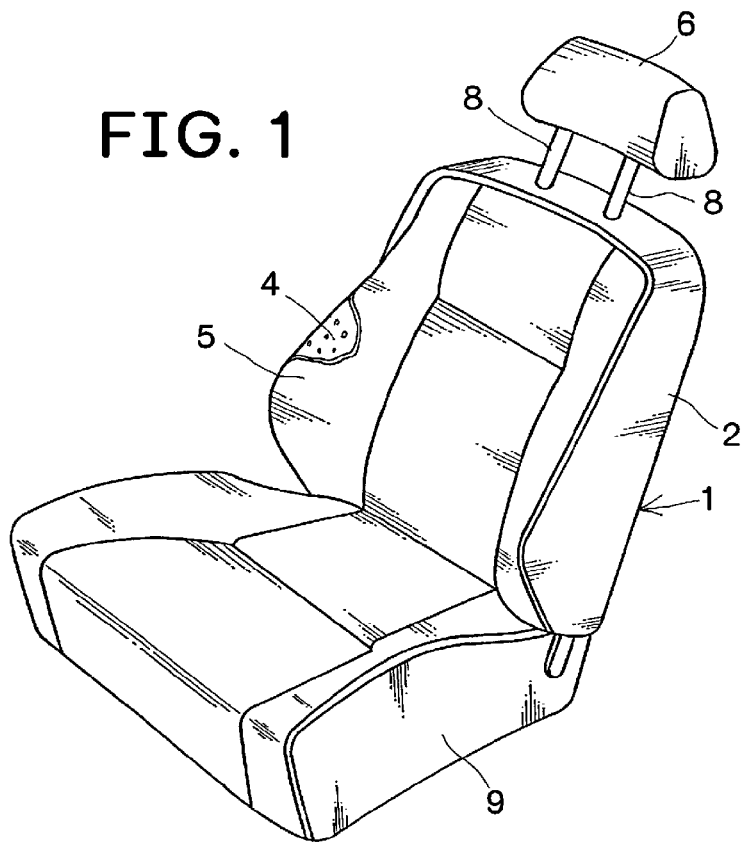
FIG. 1 is a perspective view of a vehicle seat.
Figure 2:
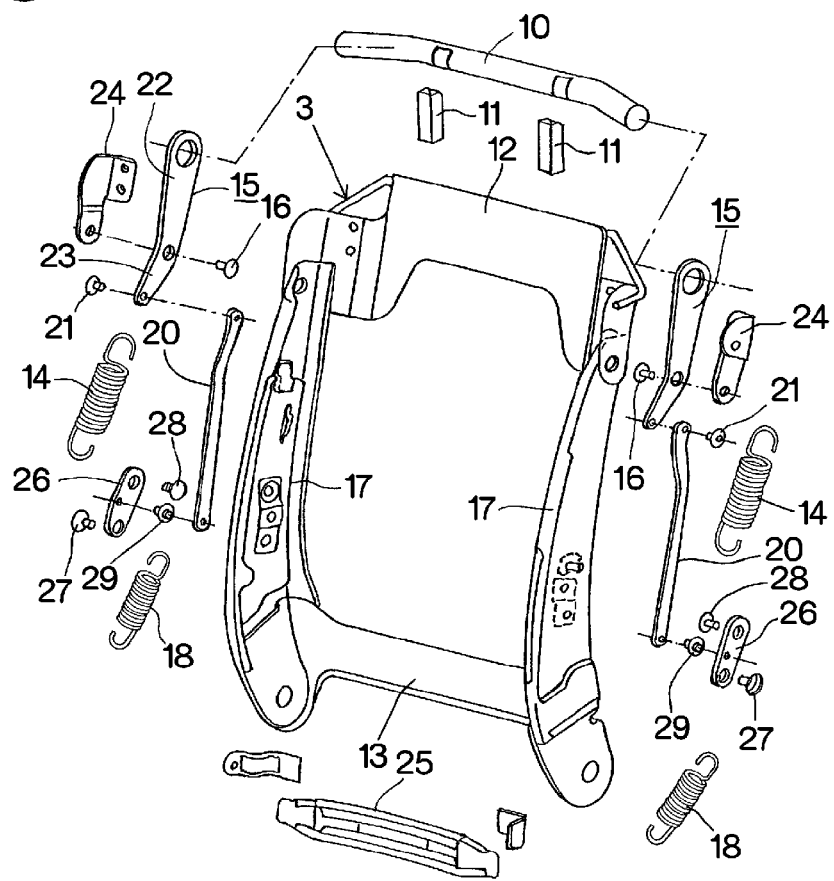
FIG. 2 is an exploded perspective view of basic parts of a seatback frame and an active headrest mechanism of the vehicle seat.
Figure 3:
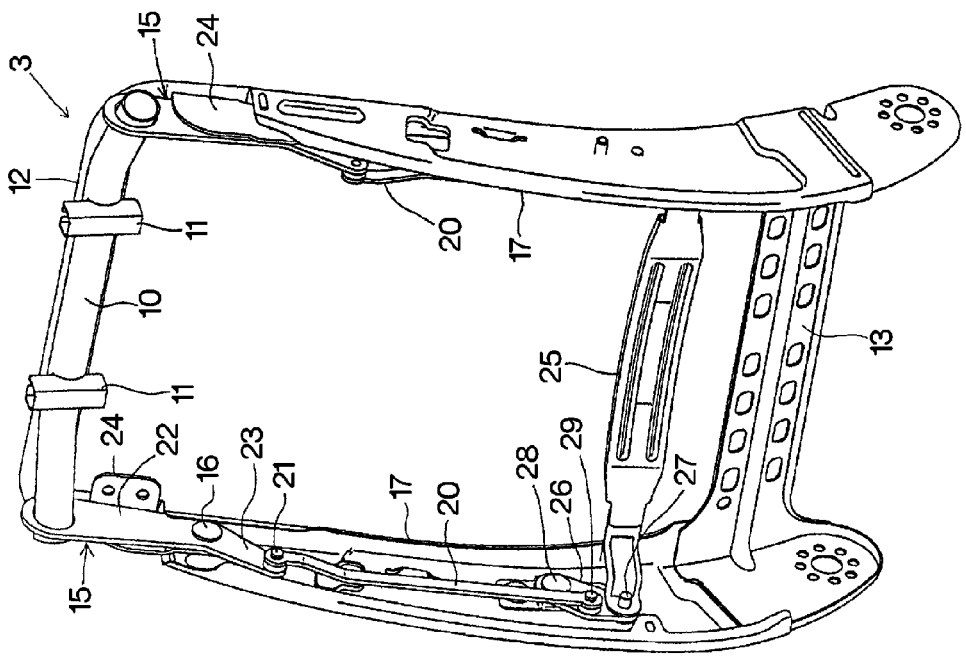
FIG. 3 is a perspective view showing an assembled state of the parts in FIG. 2.

An embodiment of the present invention will be described by using the drawings. A vehicle seat 1 in the invention includes a seatback 2, a seat bottom 9, and a headrest 6 provided above the seatback 2. A seatback frame 3 of the seatback 2 has a pair of side frames 17, an upper frame 12, and a lower frame 13 and is in a square frame shape. The vehicle seat 1 has a cushion 4 covered with a skin member 5.

Disposed in a vicinity of the upper frame 12 is a headrest support portion 10 movable with respect to the seatback frame 3 and extending laterally. Fixed to the support portion 10 are vertical engagement portions 11 into which lower portions of pillars 8 of the headrest 6 are inserted. The pillars 8 are supported by the vertical engagement portions 11 to be adjustable in height.

A bracket 24 is provided at each of upper portions of the respective side frames 17 or at each end portion of the upper frame 12. To the bracket 24, an upper link or bell crank 15 is rotatably mounted by a shaft 16. The upper link 15 has an upper long arm 22 extending upward and a lower short arm 23 extending forward and downward. The upper link 15 is biased clockwise in FIG. 5 with resilience of an upper spring 14. The spring 14 has a first end portion coupled to the upper link 15 and a second end portion coupled to the side frame 17. Left and right opposite ends of the headrest support portion 10 are respectively coupled to the upper arms 22, 22. The lower arm 23 is pivoted on an upper portion of a vertically long coupling rod 20 by a pin 21.

Figure 5:
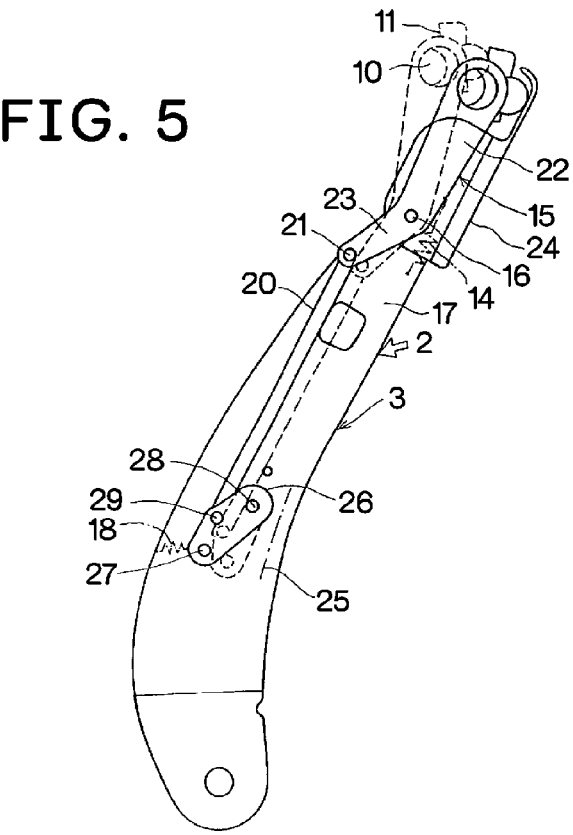
FIG. 5 is a side view of a side frame of the seatback frame and basic parts of the active headrest mechanism.

The upper link 15 is normally retained in a position shown in a solid line in FIG. 5 with the resilience of the upper spring 14 or the like and, as a result, the headrest 6 is also retained in a normal position. However, if the upper link 15 rotates counterclockwise toward a position shown in a dotted line, the headrest support portion 10 moves forward and the headrest 6 is pushed out forward.

Disposed between the side frames 17, 17 is a vehicle rear collision detecting body 25 extending laterally. The collision detecting body 25 moves rearward when the vehicle seat 1 moves forward with respect to a seated person due to rear collision and the person is pushed against the body 25. Opposite ends of the detecting body 25 are respectively coupled to lower links 26, 26 by pins 27, 27 and the lower links 26, 26 are pivoted on the side frames 17, 17 by shafts 28, 28. To each of the lower links 26, a lower portion of the coupling rod 20 is coupled by a pin 29. As shown in FIG. 5, one end of a lower spring 18 is coupled to the lower link 26, the other end is coupled to the side frame 17, and the lower link 26 is biased clockwise. In this way, the collision detecting body 25 is retained in a front normal position.

If the rear collision occurs, the collision detecting body 25 is pushed by the seated person, moves rearward, rotates the lower links 26 counterclockwise, and moves the coupling rods 20 down in FIG. 5. As this time, because a distance between the pin 29 and the shaft 28 is shorter than a distance between the pin 27 and the shaft 28, the rearward movement of the collision detecting body 25 is efficiently transmitted to the coupling rod 20. The downward movement of the rod 20 rotates the upper link 15 counterclockwise and, as a result, the headrest support portion 10 moves forward. At this time, because the upper arm 22 of the upper link 15 is longer than the lower arm 23, the downward movement of the coupling rod 20 efficiently moves the headrest support portion 10 forward. As a result of the forward movement of the support portion 10, the headrest 6 is pushed out forward to protect a head portion (neck) of the seated person at the time of the rear collision.

The side frames 17 are formed of metal plates having predetermined width in a front-rear direction. A transmitting mechanism for transmitting the rearward movement of the collision detecting body 25 to the headrest support portion 10 is disposed near the side frames 17. Therefore, the cushion 4 of the seatback 2 does not interfere with movement of the transmitting mechanism. The mechanism from the collision detecting body 25 to the headrest support portion 10 is an active headrest mechanism.

Figure 4:
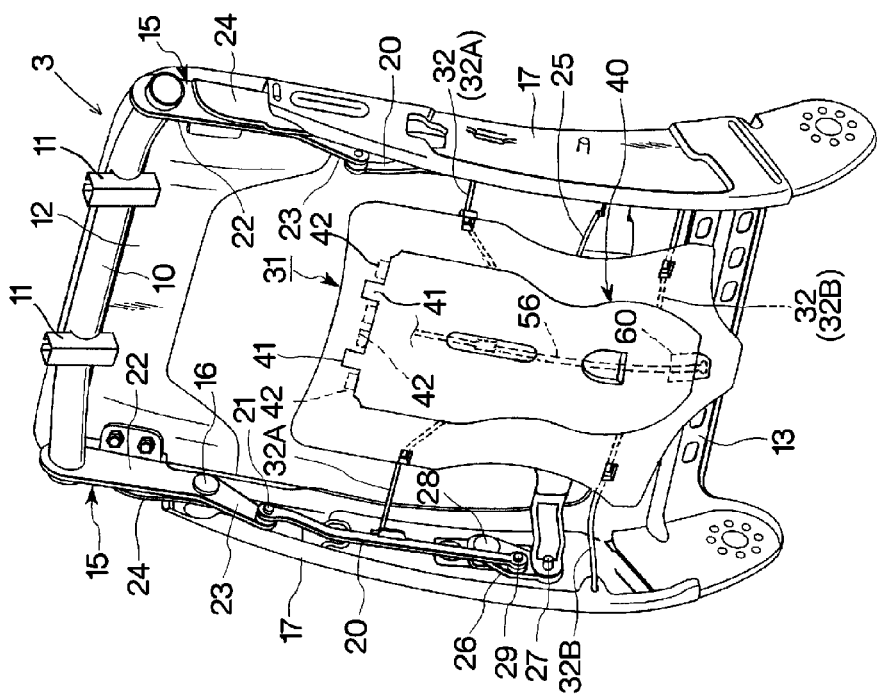
FIG. 4 is a perspective view showing a state in which a cushion plate and an auxiliary plate are mounted to the assembly in FIG. 3.

Inside the back frame 3, a flexible cushion plate 31 is disposed as shown in FIG. 4. The plate 31 is preferably made of synthetic resin such as polypropylene and preferably in a substantially pentagonal shape similar to a home base in baseball. A back face of the plate 31 is supported by seat springs 32 such as zigzag springs and formed wire springs. The seatback cushion 4 is disposed in front of the cushion plate 31.

Figure 6:
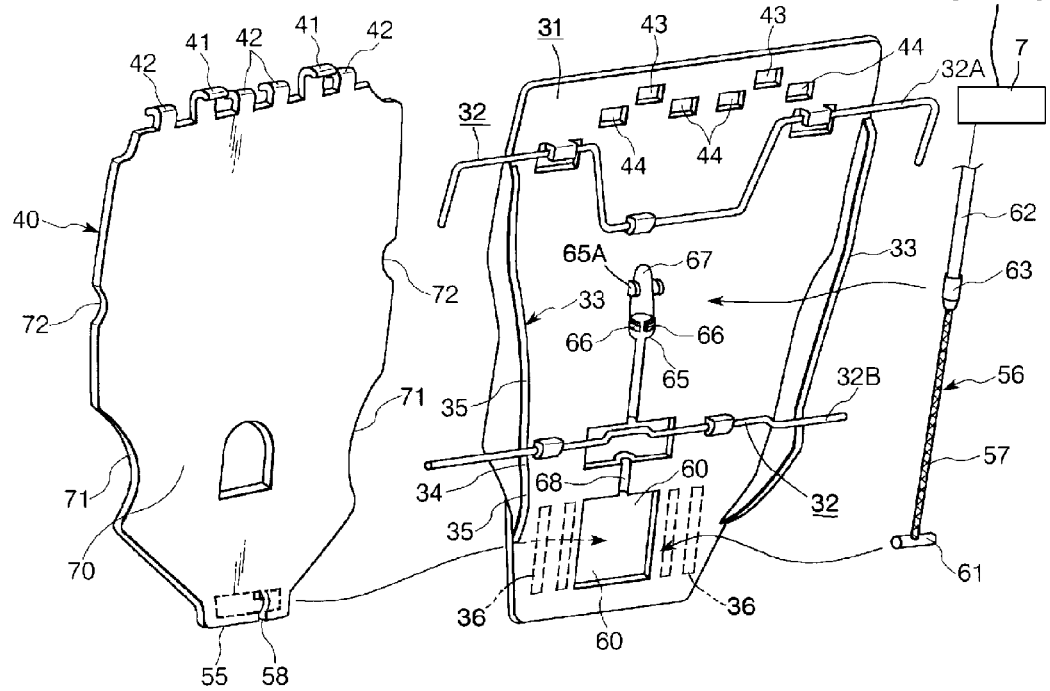
FIG. 6 is a perspective view showing the cushion plate, the auxiliary plate, and a wire cable.

The seat springs 32 include at least an upper seat spring 32A and a lower seat spring 32B as shown in FIGS. 4 and 6. The respective springs 32 extend substantially laterally and their opposite ends are coupled to the side frames 17, 17 of the seatback frame 3.

The cushion plate 31 bends under a load of the seated person and moves rearward against resilience of the springs 32 to thereby flexibly support the seated person. Since the plate 31 supports the cushion 4 with its "face", it can provide greater stability and comfort to the seated person as compared with the prior-art structure where the cushion 4 is supported by the springs 32 only.

A lower portion of the cushion plate 31 can support a sacrum area of the seated person and can support a hip area of the seated person.

The collision detecting body 25 is disposed behind the cushion plate 31 with a predetermined interval therebetween. Since the cushion plate 31 is in a plate shape that widely covers a back of the seated person, it receives the load of the seated person with large part of it and moves rearward at the time of rear collision. An amount of rearward movement of the cushion plate 31 is the greatest between its vertical middle portion and its portion slightly below the middle portion. Therefore, the collision detecting body 25 is preferably disposed in the vertical middle position or the position slightly below the middle position of the cushion plate 31 so that it can reliably receive the rearward movement of the cushion plate 31.

With the above-described combination of the cushion plate 31 and the collision detecting body 25, a comfortable sitting feeling, a feeling of being held, and reliable detection of rear collision can be expected.

Figure 7:
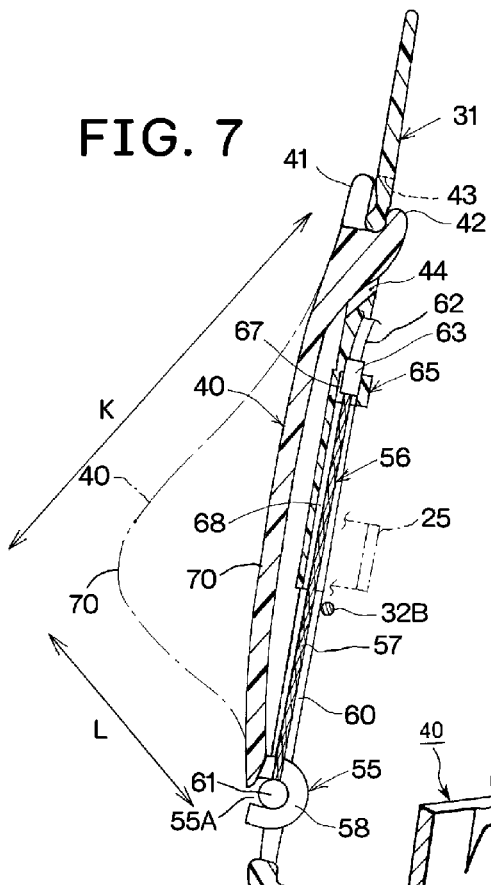
FIG. 7 is a sectional view of an assembled state of the parts in FIG. 6.
Figure 8:
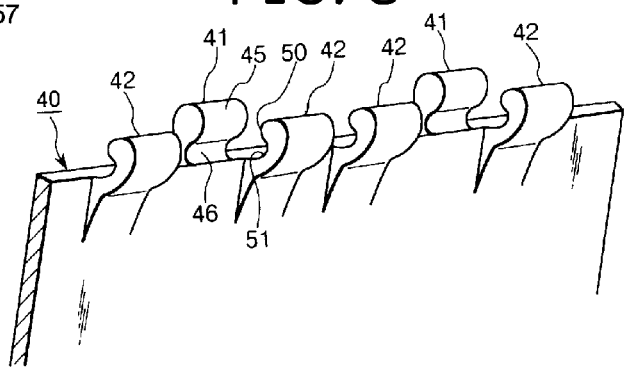
FIG. 8 is a perspective view showing an upper portion of the auxiliary plate.

Between the seat cushion 4 and the cushion plate 31, a flexible auxiliary plate 40 is provided. The auxiliary plate 40 is preferably made of synthetic resin such as polypropylene and is in a single rectangular plate shape smaller than the cushion plate 31. The auxiliary plate 40 is mounted to the cushion plate 31 and curves forward according to operation by the seated person as shown in FIG. 7. As the auxiliary plate 40 curves, the cushion 4 is pushed out forward and cushion pressure applied to the seated person is adjusted.

Figure 9:
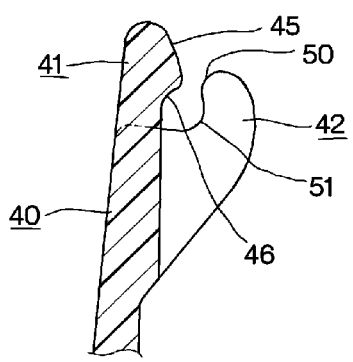
FIG. 9 is a sectional view of the upper portion of the auxiliary plate.

At an upper portion of the auxiliary plate 40, a plurality of rear-facing hooks 41 and a plurality of front-facing hooks 42 are formed integrally. The rear-facing hooks 41 are engaged in upper engagement holes 43 formed in the cushion plate 31 and the front-facing hooks 42 are engaged in lower engagement holes 44 formed in the cushion plate 31. As is clearly shown in FIG. 9, each of the rear-facing hooks 41 has a rear inclined cam face 45 and a rear arcuate engagement face 46 extending from the cam face 45 and each of the front-facing hooks 42 has a front inclined cam face 50 and a front arcuate engagement face 51 extending from the cam face 50.

Figure 10:
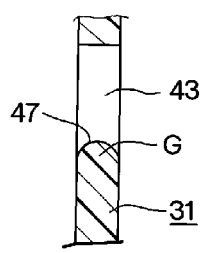
FIG. 10 is a partial sectional view of the cushion plate.
Figure 11:
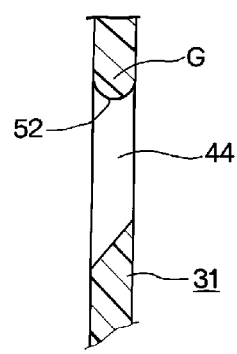
FIG. 11 is a partial sectional view of the cushion plate.
Figure 12:
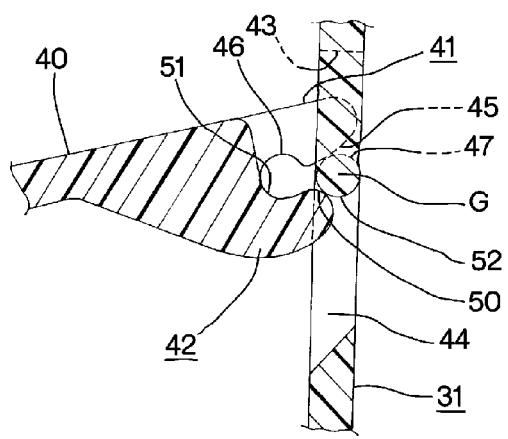
FIG. 12 is a sectional view showing a state immediately before the upper portion of the auxiliary plate is coupled to the cushion plate.

A lower edge of the upper engagement hole 43 is formed into an upward bulging arcuate edge 47 as shown in FIG. 10 and the arcuate engagement face 46 of the rear-facing hook 41 is fitted with the arcuate edge 47. An upper edge of the lower engagement hole 44 is formed into a downward bulging arcuate edge 52 as shown in FIG. 11 and the arcuate engagement face 51 of the front-facing hook 42 is fitted with the arcuate edge 52. Axial centers of the arcuate edges 47 of the upper engagement holes 43 and axial centers of the arcuate edges 52 of the lower engagement holes 44 are aligned with each other on a center line G. In this way, the arcuate edges 47 and the arcuate edges 52 apparently form a single round bar as shown in FIG. 12. A diameter of the round bar is equal to or slightly shorter than a distance between the arcuate engagement face 46 and the arcuate engagement face 51.

Figure 13:
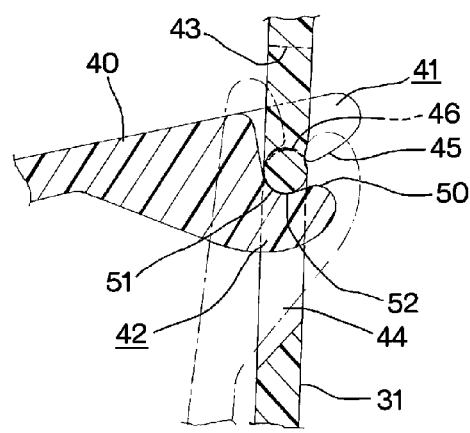
FIG. 13 is a sectional view showing a state in which the upper portion of the auxiliary plate is coupled to the cushion plate.
Figure 14:
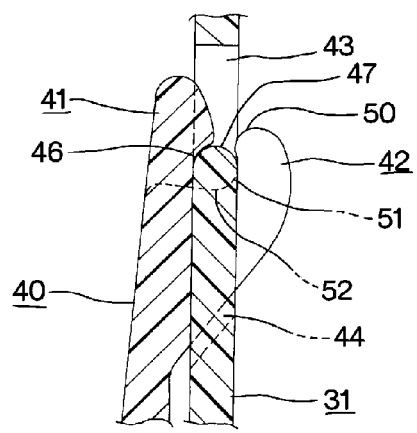
FIG. 14 is a sectional view showing a relationship between a rear-facing hook and an upper engagement hole when the auxiliary plate is made parallel to the cushion plate.
Figure 15:
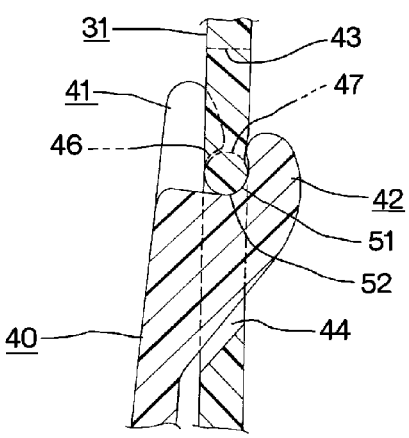
FIG. 15 is a sectional view showing a relationship between a front-facing hook and a lower engagement hole when the auxiliary plate is made parallel to the cushion plate.
Figure 16:
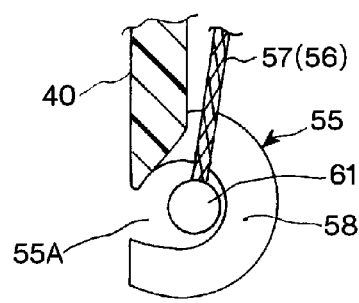
FIG. 16 is a sectional view of a lower engagement portion of the auxiliary plate and the wire cable.

As shown in FIG. 12, if the auxiliary plate 40 is made substantially horizontal and moved rearward to insert the rear-facing hooks 41 and the front-facing hooks 42 into the upper engagement holes 43 and the lower engagement holes 44 in the cushion plate 31, respectively, the inclined cam faces 45 of the rear-facing hooks 41 come in contact with the arcuate edges 47 of the upper engagement holes 43 and the inclined cam faces 50 of the front-facing hooks 42 come in contact with the arcuate edges 52 of the lower engagement holes 44. Clearances between the rear-facing hooks 41 and the front-facing hooks 42 are elastically widened and then the arcuate engagement faces 46 of the rear-facing hooks 41 and the arcuate engagement faces 51 of the front-facing hooks 42 are closely fitted with the arcuate edges 47 and the arcuate edges 52, respectively, as shown in FIG. 13. Then, if the auxiliary plate 40 is rotated so that it becomes parallel to the cushion plate 31, mounting of the upper portion of the auxiliary plate 40 and the cushion plate 31 to each other is completed.

A lower engagement portion 55 slightly protruding rearward is formed at a lower portion of the auxiliary plate 40. A cable head 61 of an inner cable 57 of a wire cable 56 is locked to the lower engagement portion 55. The wire cable 56 is coupled to an operation portion 7 provided to the vehicle seat 1. The lower engagement portion 55 has a housing recessed portion 55A for housing the cable head 61 and a slit 58 which the inner cable 57 can pass through.

A lower portion of the cushion plate 31 is formed with a lower guide slot 60 in which the lower engagement portion 55 is engaged for sliding. If the cable head 61 moves up and down according to operation by the seated person, the lower engagement portion 55 smoothly moves up and down without wobbling while guided by the slot 60. Therefore, a width of the lower engagement portion 55 and a width of the slot 60 are set properly so that the wobbling does not occur.

The cushion plate 31 is provided with a tube retaining portion 65 for retaining a tip end 63 of an outer tube 62 of the wire cable 56. The tube retaining portion 65 is preferably formed of a recessed portion 67 and a pair of retaining arms 66 formed at the cushion plate 31. A groove passage 68 in which the inner cable 57 is disposed is formed on a back face of the cushion plate 31 and between the tube retaining portion 65 and the lower guide slot 60. The tube retaining portion 65 is preferably formed in such a recessed shape that a part or the whole of the tip end 63 of the outer tube 62 sinks in a front-rear width of the cushion plate 31.

Another upper tube retaining portion 65A may be provided in a position above the tube retaining portion 65. The upper tube retaining portion 65A smoothly retains a middle portion of the outer tube 62 and prevents the wire cable 56 from coming off the cushion plate 31.

If the seated person operates the operation portion 7 to move the cable head 61 up, the lower engagement portion 55 smoothly moves up without wobbling while guided by the slot 60, the auxiliary plate 40 curves to push the cushion 4 out forward, as shown in FIG. 7, and cushion pressure applied to the seated person is adjusted.

However, it is not preferable that the auxiliary plate 40 protrudes the furthest in the forward direction in its different vertical positions under influences of pressure and the like received from the seated person. For example, it is impossible to obtain preferable comfort if the upper portion of the auxiliary plate 40 protrudes forward when a relatively light woman actuates the auxiliary plate 40 while the lower portion of the auxiliary plate 40 protrudes forward when a large man actuates the auxiliary plate 40.

Therefore, the auxiliary plate 40 is formed with a push-out portion 70 that easily bulges forward. When the seated person operates the operation portion 7, the auxiliary plate 40 protrudes forward at and around the push-out portion 70, which stabilizes the position of the auxiliary plate 40 that protrudes the furthest in the forward direction. To form the push-out portion 70, in the invention of the present application, constricted portions 71 are formed on left and right opposite sides of the auxiliary plate 40, as shown in FIG. 6, to thereby form the push-out portion 70 between the constricted portions 71, 71. Since the push-out portion 70 in the invention of the present application is short in left-right width, the push-out portion 70 of the auxiliary plate 40 bends easily.

Furthermore, by forming other upper constricted portions 72 at the auxiliary plate 40, it is possible to control a forward protruding shape of the auxiliary plate 40 at and around the push-out portion 70. In other words, it is possible to bring a whole bent profile of the auxiliary plate 40 to an ideal shape.

In a strict sense, a suitable position of the push-out portion 70 varies in a vertical direction depending on a body type of the seated person. In general, a large seated person prefers to set the push-out portion 70 in an upper position while a small seated person prefers to set the push-out portion 70 in a lower position. However, it is difficult to meet such demands with a low-cost mechanism. However, it is possible for a low-cost mechanism to further stabilize the position of the push-out portion 70. For example, if the push-out portion 70 is pushed out forward by operation of the operation portion 7, the push-out portion 70 gradually moves upward or gradually moves downward. Such unstable phenomena can be reduced by setting a distance K between an upper end of the auxiliary plate 40 and the push-out portion 70 longer and setting a distance L between a lower end of the auxiliary plate 40 and the push-out portion 70 shorter.

In the above description, the upper end of the auxiliary plate 40 refers to a mount portion of the auxiliary plate 40 to the cushion plate 31 and is substantially equal to the center line G. On the other hand, the lower end of the auxiliary plate 40 is equal to the lower engagement portion 55. When the push-out portion 70 of the auxiliary plate 40 is pushed out forward, the push-out portion 70 cannot move horizontally. However, if the distance K is long, the push-out portion 70 can move on an arc around the center line G with a large radius. Therefore, the longer the distance K, the closer to horizontal the track of the forward movement of the push-out portion 70 becomes. In this way, it is possible to suppress the large upward or downward movement of the push-out portion 70 when the push-out portion 70 moves forward.

An upper edge of the auxiliary plate 40 is in the same vertical position as or above the upper seat spring 32A and a lower edge of the auxiliary plate 40 is positioned below the lower seat spring 32B. In this way, it is possible to dispose, in the vicinity of the front side of the cushion plate 31, the auxiliary plate 40 that is sufficiently large for the cushion plate 31.

The cushion plate 31 is formed in a substantially pentagonal shape similar to the home base in baseball. The cushion plate 31 is integrally formed on its left and right opposite sides with flanges 33 protruding rearward or forward. Because the flanges 33 extend vertically and are orthogonal to the cushion plate 31, it is possible to increase rigidity of the cushion plate 31. By changing height, length, thickness, and the like of the flanges 33, it is possible to change the rigidity of the cushion plate 31 according to a demand. The cushion plate 31 having the flanges 33 can smoothly curve the auxiliary plate 40 forward. If the rigidity of the cushion plate 31 is low, the auxiliary plate 40 cannot withstand a bounce received from the cushion 4 and the cushion plate 31 itself may be deformed, though it is not supposed to be, which results in an insufficient amount of curve of the auxiliary plate 40.

Height (an amount of forward or rearward protrusion) of the flange 33 is not constant. The flange 33 has a top portion 34 corresponding to the push-out portion 70 of the auxiliary plate 40 and inclined portions 35 formed above and below the top portion 34 and reducing gradually in height. The top portion 34 corresponding to the push-out portion 70 increases strength of a portion of the cushion plate 31 that receives the most pressure.

Figure 17:
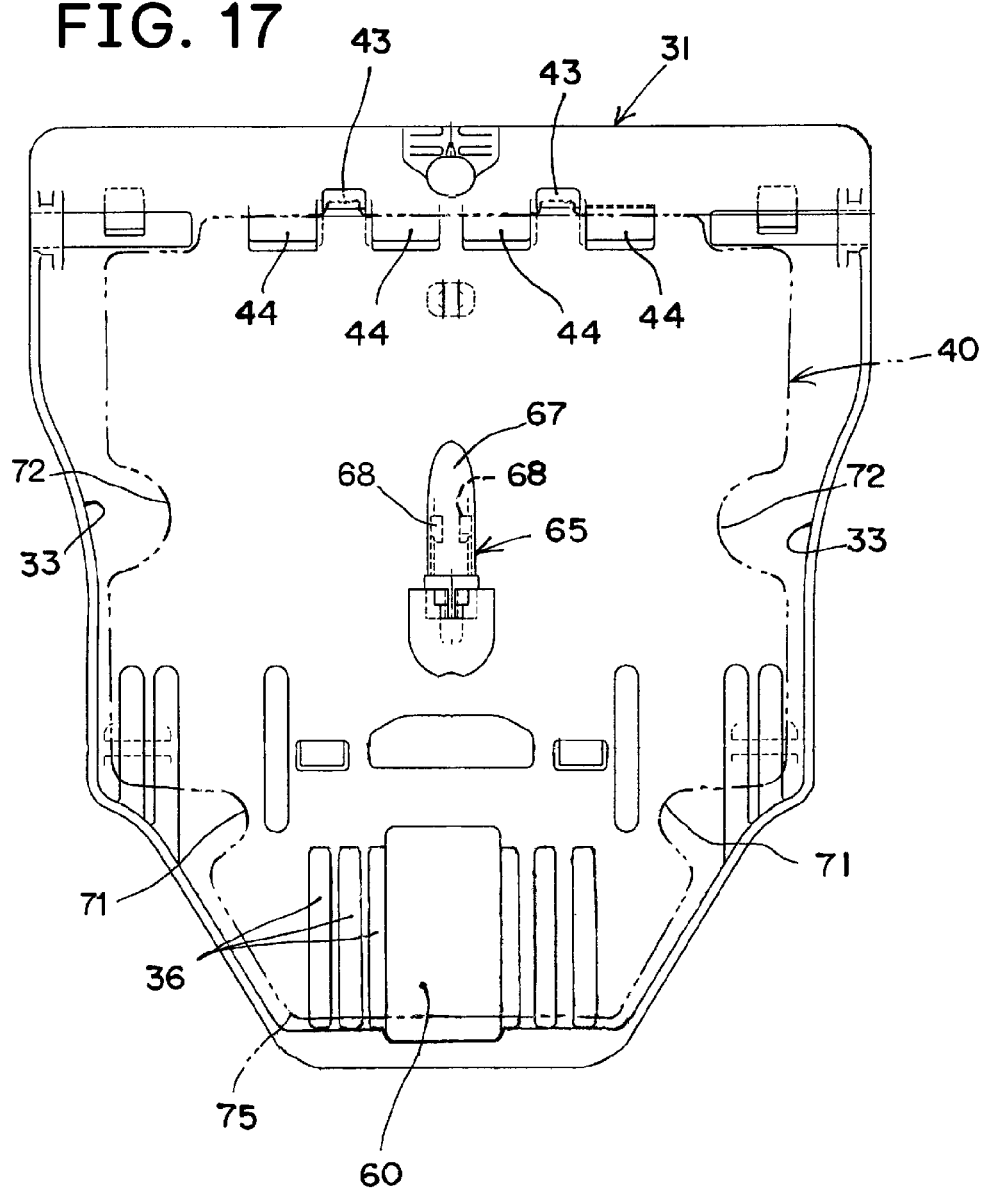
FIG. 17 is a front view of the cushion plate.
Figure 18:
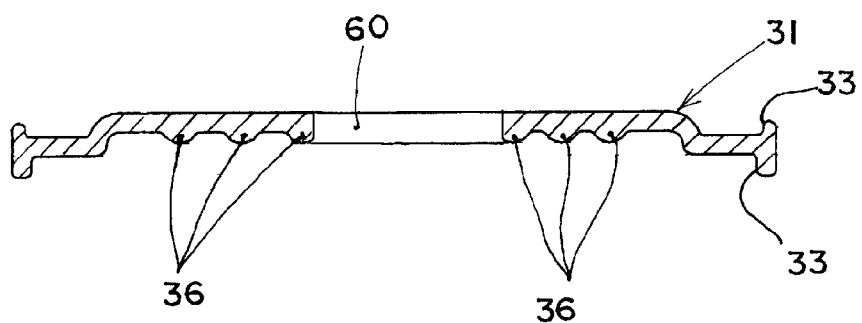
FIG. 18 is a cross-sectional view of the cushion plate.

On a front face of the cushion plate 31, a plurality of vertically extending ribs 36 are provided as shown in FIGS. 6, 17, and 18. The ribs 36 effectively suppress noise generated between the auxiliary plate 40 and the cushion plate 31 when the lower engagement portion 55 of the auxiliary plate 40 moves upward or downward in the lower guide slot 60 of the cushion plate 31. Without the ribs 36, the lower portion of the auxiliary plate 40 and the lower portion of the cushion plate 31 come in contact with each other in large areas, which produces much noise. However, the ribs 36 having arcuate tip ends come in line contact with the cushion plate 31 as shown in FIG. 18, which reduces contact resistance in upward or downward movement of the lower portion of the auxiliary plate 40 with respect to the lower portion of the cushion plate 31 and effectively suppresses generation of noise.

The ribs 36 are preferably disposed on opposite sides of the lower guide slot 60 of the cushion plate 31. The ribs 36 are substantially equal in length to a vertical moving distance of the lower engagement portion 55 of the auxiliary plate 40.

In addition, a lower edge positioned on opposite sides of the lower engagement portion 55 of the auxiliary plate 40 is preferably formed with a lateral rib 75 protruding toward the cushion plate 31. The lateral rib 75 has a function of coming in sliding contact with the vertical ribs 36 of the cushion plate 31. If the auxiliary plate 40 has the lateral rib 75, contact of the lower portion of the auxiliary plate 40 with the lower portion of the cushion plate 31 changes from the line contact to point contact to thereby further reduce the contact resistance in the upward or downward movement of the lower portion of the auxiliary plate 40 with respect to the lower portion of the cushion plate 31 to effectively suppress generation of noise. Moreover, the lateral rib 75 increases rigidity of the lower portion of the auxiliary plate 40.

The invention claimed is:

1. A vehicle seat comprising:
a seatback frame including a pair of side frames;
a seat spring mounted between the side frames;
a single plate-shaped flexible cushion plate having a back face mounted to the seat spring;
a seatback cushion provided in front of the cushion plate;
a single plate-shaped flexible auxiliary plate provided between the seatback cushion and the cushion plate and mounted on the cushion plate;
wherein the auxiliary plate curves to form a forward bulge when a lower portion of the auxiliary plate moves upward with respect to the cushion plate,
wherein the forward bulge retracts when the lower portion of the auxiliary plate moves downward with respect to the cushion plate, and
wherein the cushion plate has a vertically extending rib with which the lower portion of the auxiliary plate comes in contact, the vertically extending rib extending from a position below a position on the cushion plate that is opposed to the forward bulge of the auxiliary plate to a position near a bottom of the cushion plate.

2. The vehicle seat according to claim 1, wherein the auxiliary plate has an upper portion mounted on the cushion plate in a fixed manner so as not to be able to move vertically and a lower engagement portion coupled to a cable head of a wire cable extending to reach an operation portion, the lower engagement portion is slidably engaged in a lower guide slot in the cushion plate, and the rib is provided beside the lower guide slot.

3. The vehicle seat according to claim 2, wherein the rib is substantially equal in length to a vertical moving distance of the lower engagement portion.

4. The vehicle seat according to claim 1, wherein a lower edge positioned on opposite sides of the lower engagement portion of the auxiliary plate is formed with a lateral rib protruding toward the cushion plate.

5. The vehicle seat according to claim 1, further comprising flanges provided at left and right opposite sides of the cushion plate for increasing rigidity of the cushion plate.

6. The vehicle seat according to claim 5, wherein each of the flanges has a top portion and inclined portions provided above and below the top portion and reducing gradually in height, and the top portion is disposed in a position corresponding to the position of the forward bulge of the auxiliary plate.

7. A vehicle seat comprising:
a seatback frame including a pair of side frames;
a seat spring mounted between the side frames;
a single plate-shaped flexible cushion plate having a back face mounted to the seat spring;
a seatback cushion provided in front of the cushion plate;
a single plate-shaped flexible auxiliary plate provided between the seatback cushion and the cushion plate and mounted on the cushion plate;
wherein the auxiliary plate curves to form a forward bulge when a lower portion of the auxiliary plate moves upward with respect to the cushion plate,
wherein the forward bulge retracts when the lower portion of the auxiliary plate moves downward with respect to the cushion plate,
wherein the cushion plate has a vertically extending rib with which the lower portion of the auxiliary plate comes in contact, and
wherein the auxiliary plate has an upper portion mounted on the cushion plate in a fixed manner so as not to be able to move vertically and a lower engagement portion coupled to a cable head of a wire cable extending to reach an operation portion, the lower engagement portion is slidably engaged in a lower guide slot in the cushion plate, and the rib is provided beside the lower guide slot.

8. The vehicle seat according to claim 7, wherein the rib is substantially equal in length to a vertical moving distance of the lower engagement portion.

9. The vehicle seat according to claim 7, wherein a lower edge positioned on opposite sides of the lower engagement portion of the auxiliary plate is formed with a lateral rib protruding toward the cushion plate.

10. The vehicle seat according to claim 7, further comprising flanges provided at left and right opposite sides of the cushion plate for increasing rigidity of the cushion plate.

11. The vehicle seat according to claim 10, wherein each of the flanges has a top portion and inclined portions provided above and below the top portion and reducing gradually in height, and the top portion is disposed in a position corresponding to the position of the forward bulge of the auxiliary plate.

* * * * *